(12) United States Patent
Sengupta

(10) Patent No.: US 8,848,175 B2
(45) Date of Patent: Sep. 30, 2014

(54) TEST SYSTEMS THAT INCLUDE A CENTERING SYSTEM FOR ALIGNING AN OPTICAL PULSE LAUNCHING DEVICE WITH A MULTI-MODE FIBER AND METHODS OF OPERATING THE SAME

(75) Inventor: Abhijit Sengupta, Alpharetta, GA (US)

(73) Assignee: CommScope, Inc. of North Carolina, Hickory, NC (US)

(*) Notice: Subject to any disclaimer, the term of this patent is extended or adjusted under 35 U.S.C. 154(b) by 540 days.

(21) Appl. No.: 13/045,327

(22) Filed: Mar. 10, 2011

(65) Prior Publication Data

US 2011/0222052 A1   Sep. 15, 2011

Related U.S. Application Data

(60) Provisional application No. 61/312,467, filed on Mar. 10, 2010.

(51) Int. Cl.
| | | |
|---|---|---|
| *G01N 21/00* | (2006.01) | |
| *G01B 11/00* | (2006.01) | |
| *G01B 11/26* | (2006.01) | |
| *G02B 6/26* | (2006.01) | |
| *G02B 6/42* | (2006.01) | |
| *G01M 11/00* | (2006.01) | |

(52) U.S. Cl.
CPC ........... *G01M 11/338* (2013.01); *G02B 6/4225* (2013.01); *G01M 11/332* (2013.01)
USPC ............. 356/73.1; 356/399; 356/153; 385/52

(58) Field of Classification Search
USPC ........................................................ 356/73.1
See application file for complete search history.

(56) References Cited

U.S. PATENT DOCUMENTS 4,474,423 A * 10/1984 Bisbee et al. .................... 385/52

5,177,348 A * 1/1993 Laor .......................... 250/201.1
(Continued)

FOREIGN PATENT DOCUMENTS

| EP | 1-798-537 A1 | 6/2007 |
|---|---|---|
| GB | 2-040-495 A | 1/1980 |
| WO | WO 03/025645 A2 | 3/2003 |

OTHER PUBLICATIONS

International Preliminary Report on Patentability Corresponding to International Application No. PCT/US2011/027941; Date of Mailing: Sep. 20, 2012; 9 Pages.

(Continued)

*Primary Examiner* — Tri T Ton
*Assistant Examiner* — Hina F Ayub
(74) *Attorney, Agent, or Firm* — Myers Bigel Sibley & Sajovec, PA

(57) ABSTRACT

A test system for a multi-mode fiber comprises a launching device that is configured to generate optical pulses and has a rest position. A centering system is operable to move the launching device in a circular motion having a center corresponding to the rest position and a diameter corresponding to a core diameter of the multi-mode fiber. The centering system is further operable to adjust a position of the multi-mode fiber relative to the launching device while the launching device is moving in the circle until an optical power coupled from the launching device into the multi-mode fiber is below a threshold. The centering system optically centers the launching device with the multi-mode fiber by fixing the position of the multi-mode fiber responsive to the optical power coupled from the launching device into the multi-mode fiber being below the threshold and returning the launching device to the rest position. In addition, the centering system can move the launching device in a circular motion to launch optical pulses into a multi-mode fiber to perform differential mode delay measurements, which may result in better screening of any circular inhomogeneity of the core of the multi-mode fiber.

19 Claims, 6 Drawing Sheets

(56) References Cited

U.S. PATENT DOCUMENTS

| | | | |
|---|---|---|---|
| 5,600,739 A * | 2/1997 | Anderson et al. | 385/16 |
| 6,788,397 B1 * | 9/2004 | Golowich et al. | 356/121 |
| 7,181,105 B2 * | 2/2007 | Teramura et al. | 385/27 |
| 2003/0185516 A1 * | 10/2003 | Kennedy et al. | 385/49 |
| 2005/0090912 A1 * | 4/2005 | Ichikawa et al. | 700/66 |
| 2005/0231730 A1 * | 10/2005 | Jeffers et al. | 356/480 |
| 2008/0165360 A1 * | 7/2008 | Johnston | 356/394 |

OTHER PUBLICATIONS

Sengupta, Abhijit: "BER Performance and Differential Modal Delay of High Bandwidth Multimode Fibers", International Wire & Cable Symposium, Proceedings of the 55$^{th}$ IWCS/Focus vol. 55 (2006), pp. 250-257.

Sengupta, Abhijit: "Calculated Modal Bandwidths of an OM4 Fiber and the Theoretical Challenges", International Wire & Cable Symposium, Proceedings of the 58$^{th}$ IWCS/IICIT, vol. 58 (2009), pp. 24-29.

Sengupta, Abhijit: "Comparison of min-EMBc and DMD Template Based Qualification of High Bandwidth Multimode Fibers", International Wire & Cable Symposium, Proceedings of the 56$^{th}$ IWCS, vol. 56 (2007), pp. 154-160.

Sengupta, Abhijit: "Simulation of 10GbE Multimode Optical Communications Systems", International Wire & Cable Symposium, Proceedings of the 57$^{th}$ IWCS, vol. 57 (2008), pp. 320-326.

International Search Report Corresponding to International Application No. PCT/US2011/027941; Date of Mailing: Jun. 29, 2011; 13 pages.

* cited by examiner

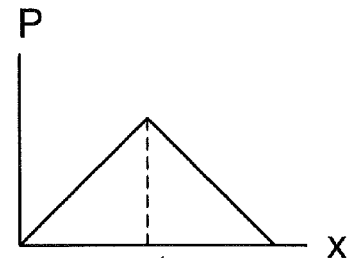
FIG. 1A
(Prior art)
FIG. 1B
(Prior Art)
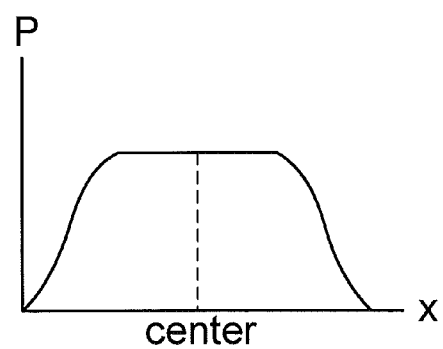
FIG. 2A
(Prior art)
FIG. 2B
(Prior art)
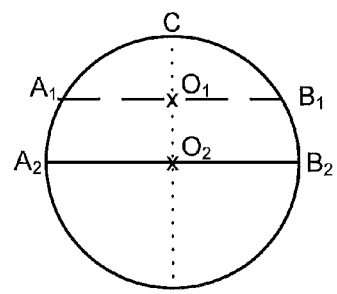
FIG. 2C
(Prior art)

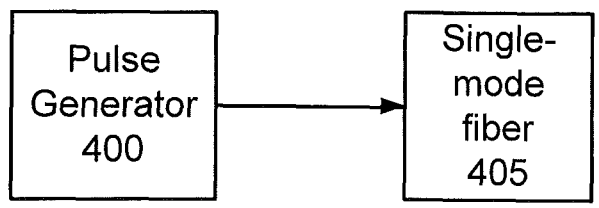
FIG. 4A
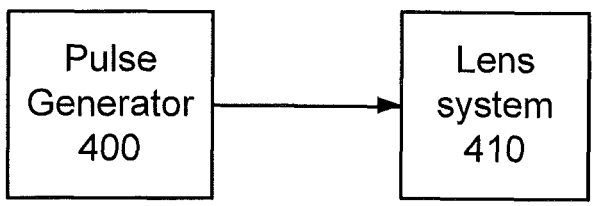
FIG. 4B
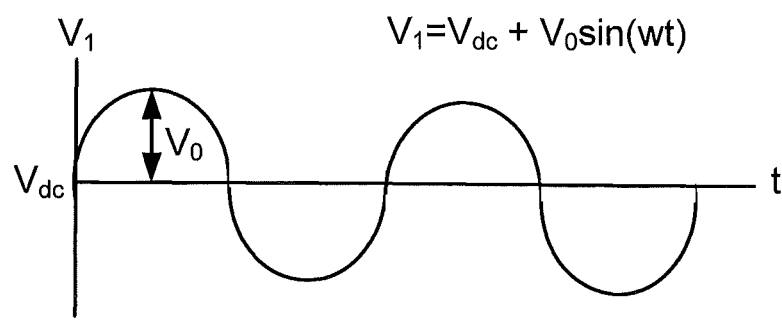
FIG. 5A
FIG. 5B

TEST SYSTEMS THAT INCLUDE A CENTERING SYSTEM FOR ALIGNING AN OPTICAL PULSE LAUNCHING DEVICE WITH A MULTI-MODE FIBER AND METHODS OF OPERATING THE SAME

CROSS REFERENCE TO RELATED APPLICATION

This application claims the benefit of U.S. Provisional Patent Application No. 61/312,467, filed Mar. 10, 2010, the disclosure of which is hereby incorporated herein by reference in its entirety.

BACKGROUND

The present disclosure relates generally to test systems for fiber optic cable and methods of operating the same and, more particularly, to differential mode delay (DMD) test systems for multi-mode fiber optical cable and methods of operating the same.

When an optical source is directly coupled to a multi-mode fiber DMD may occur. DMD refers to a phenomenon where a single light pulse excites multiple modes within a multi-mode fiber that propagate at different speeds through the multi-mode fiber causing the different modes to be spread in time. Thus, when DMD occurs, a single pulse launched into a multi-mode fiber may turn into multiple independent pulses, which may interfere with other pulses in the data stream and, thus, makes it difficult to recover the data encoded.

A test system may be used to evaluate the DMD characteristics of a multi-mode fiber. Such systems typically launch optical test pulses into the core of a multi-mode fiber and evaluate the DMD associated with these test pulses. A DMD test system may use a single-mode fiber to launch the test pulses into the core of the multi-mode fiber. It may be difficult, however, to optically center the single-mode fiber with the multi-mode fiber to launch the DMD test pulses into the core of the multi-mode fiber, as a single-mode fiber may have a core diameter in the range of about 8-10 μm and a multi-mode fiber may have a core diameter in a range of about 50-62.5 μm. Single-mode fibers used to carry light pulses having a wavelength of around 850 nm may have an effective optical mode field core diameter of 5 μm while multi-mode fibers used to carry 850 nm light pulses may have a core diameter of 50 μm. One technique for centering a single-mode fiber with a multi-mode fiber is to attempt to center the two fibers geometrically where a smaller diameter core single-mode fiber is imaged into the larger diameter core multi-mode fiber. Unfortunately, geometric centering may involve expensive and relatively large vision equipment. Another technique for centering a single-mode fiber with a multi-mode fiber is based on motion control and coupled power optimization, which may require a relatively expensive and large feedback stabilization system. Conventional centering techniques, therefore, may be difficult to use in a field environment where portability is desired as many of the component parts of the feedback system may not be available in smaller sizes. Moreover, geometric centering may often be inaccurate as the geometric center of a multi-mode fiber may not be the optical center of the multi-mode fiber.

FIGS. 1A and 1B illustrate a conventional technique for aligning two fibers of the same type, i.e., two single-mode fibers or two multi-mode fibers, based on the coupling of optical power between the two fibers. As shown in FIG. 1A, one of the two single-mode or multi-mode fibers is fixed while the other single-mode or multi-mode fiber is moved along the X and Y axes while the optical power that is coupled between the two fibers is measured. The graph shown in FIG. 1B indicates that the two single-mode fibers are closest to being centered when the optical power (P) coupled between the two fibers is at the maximum along both the X and Y axes. The centering system determines the X-axis position where the power coupling is maximum and then performs the same procedure along a Y-axis, perpendicular to the X-axis (not shown). After determining the position where the coupled power (P) is at a maximum level based on relative positioning along both the X and Y axes, the two fibers are generally substantially centered. Additional iterations may be performed to increase the accuracy of the centering.

But, as described above, a multi-mode fiber has a core region having a diameter that may be approximately ten times that of the effective optical mode field of a single-mode fiber. Therefore, as shown in FIGS. 2A and 2B, when one of the single-mode fiber and the multi-mode fiber is fixed and the other is moved along an axis the optical power that is coupled between the two fibers may not have a distinct peak, but instead may have a relatively broad range where the coupled power is maximized due to the smaller core diameter of the single-mode fiber. As shown in FIG. 2C, when the single-mode fiber is moved along with the X-axis, two positions can be identified where the power coupling drops below a maximum level. These two positions $A_1$ and $B_1$ identify the boundary of the cladding surrounding the core of the multi-mode fiber and are shown connected by the dashed line in FIG. 2C. The dashed line illustrates the movement of the single-mode fiber relative to the multi-mode fiber in evaluating the coupling of optical power between the single-mode fiber and the multi-mode fiber. The distance between positions $A_1$ and $B_1$ can be divided by two to find an approximate center $O_1$ along the X-axis. The process can then be repeated by moving the single-mode fiber along the Y-axis, which is perpendicular to the X-axis and determining the two positions where the power coupling drops below a maximum level. These two positions C and D identify the cladding boundary of the multi-mode fiber and are shown connected by the dotted line in FIG. 2C. The dotted line illustrates the movement of the single-mode fiber relative to the multi-mode fiber in evaluating the coupling of optical power between the single-mode fiber and the multi-mode fiber. The distance between positions C and D can be divided by two to find an approximate center $O_2$ along the Y-axis. Theoretically, moving the single-mode fiber to the position based on dividing the distance between C and D by two would result in the single-mode fiber being optically centered with the multi-mode fiber. Unfortunately, the determination where the coupled optical power falls below the maximum level, which is used to identify the boundary positions $A_1$, $B_1$, C, and D, may be imprecise. Thus, the above-described procedure for determining the optical center along the X and Y axes may be repeated for several iterations until the single-mode fiber and the multi-mode fiber are optically centered with a desired precision. For example, single-mode fiber may be moved along the X-axis to determine two positions $A_2$ and $B_2$ where the power coupling drops below a maximum level. These two positions are shown connected by the solid line in FIG. 2C and approximately run through the point $O_2$ indicating that $O_2$ is the optical center of the multi-mode fiber. The determination of the optical center $O_2$ can be summarized by the following relationships, where X-Y is read as the distance between X and Y:

$$A_1 - O_1 = O_1 - B_1 = \tfrac{1}{2}(A_1 - B_1)$$

$$C - O_2 = O_2 - D = \tfrac{1}{2}(C - D)$$

$$A_2-O_2=O_2-B_2=\tfrac{1}{2}(A_2-B_2)$$

$$A_2-O_2=O_2-B_2=C-O_2=O_2-D=R,$$

where R is the radius of the multi-mode fiber core.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

According to some embodiments of the inventive subject matter, a test system for a multi-mode fiber comprises a launching device that is configured to generate optical pulses and has a rest position. A centering system is operable to move the launching device in a circular motion having a center corresponding to the rest position and a diameter corresponding to a core diameter of the multi-mode fiber. The centering system is further operable to adjust a position of the multi-mode fiber relative to the launching device while the launching device is moving in the circle until an optical power coupled from the launching device into the multi-mode fiber is below a threshold. The centering system optically centers the launching device with the multi-mode fiber by fixing the position of the multi-mode fiber responsive to the optical power coupled from the launching device into the multi-mode fiber being minimum or below the threshold and returning the launching device to the rest position.

In other embodiments, the launching device comprises an optical pulse generator and a lens system that is coupled to the optical pulse generator and is positioned to receive the optical pulses.

In still other embodiments, the optical pulse generator is a laser, such as a diode laser.

In still other embodiments, the launching device comprises an optical pulse generator an optical pulse generator and a single-mode fiber that is coupled to receive the optical pulses into a core thereof.

In still other embodiments, the centering system comprises a first axis movement controller and a second axis movement controller, wherein the first axis is substantially perpendicular to the second axis.

In still other embodiments, the first axis movement controller is responsive to a first axis control signal and the second axis movement controller is responsive to a second axis control signal, the first axis control signal being about 90 degrees out of phase with the second axis control signal to move the launching device in the circular motion.

In still other embodiments, the first axis movement controller comprises a first piezoelectric device and the second axis controller comprises a second piezoelectric device.

In still other embodiments, the first axis movement controller comprises a first electro-active polymer device and the second axis controller comprises a second electro active polymer device.

In still other embodiments, the first axis movement controller comprises a first magnetostrictive device and the second axis controller comprises a second magnetostrictive device In still other embodiments, the centering system is further operable, responsive to optically centering the launching device with the multi-mode fiber, to move one of the launching device and the multi-mode fiber in a circular motion relative to the other one of the launching device and the multi-mode fiber at a plurality of different radii from the rest position of the launching device to launch the optical pulses into a core of the multi-mode fiber.

In further embodiments of the inventive subject matter, a method of operating a test system for a multi-mode fiber comprises generating optical pulses using a launching device the launching device having a rest position, moving the launching device in a circular motion having a center corresponding to the rest position and a diameter corresponding to a core diameter of the multi-mode fiber, adjusting a position of the multi-mode fiber relative to the launching device while the launching device is moving in the circle until an optical power coupled from the launching device into the multi-mode fiber is minimum or below a threshold and optically centering the launching device with the multi-mode fiber by fixing the position of the multi-mode fiber responsive to the optical power coupled from the launching device into the multi-mode fiber being minimum or below the threshold and returning the launching device to the rest position.

In still further embodiments, the launching device comprises an optical pulse generator.

In still further embodiments, the launching device further comprises a lens system that is coupled to the optical pulse generator and is positioned to receive the optical pulses.

In still further embodiments, the launching device further comprises a single-mode fiber single-mode fiber that is coupled to the optical pulse generator and is positioned to receive the optical pulses.

In still further embodiments, moving the launching device comprises moving the launching device along a first axis and moving the launching device along a second axis, wherein the first axis is substantially perpendicular to the second axis.

In still further embodiments, moving the launching device along the first axis comprises moving the launching device along the first axis responsive to a first axis control signal and moving the launching device along the second axis comprises moving the launching device along the second axis responsive to a second axis control signal, wherein the first axis control signal is about 90 degrees out of phase with the second axis control signal so as to move the launching device in the circular motion.

In still further embodiments, the multi-mode fiber has a cladding that surrounds a core region. The method further comprises, responsive to determining the optical center of the multi-mode fiber, moving the one of the launching device and the multi-mode fiber in the circular motion along the face of the multi-mode fiber at a plurality of different radii from the optical center to launch the optical pulses into the core region of the multi-mode fiber.

In still other embodiments, a method of operating a test system for a multi-mode fiber comprises optically centering a launching device with the multi-mode fiber, moving one of the launching device and the multi-mode fiber in a circular motion relative to the other one of the launching device and the multi-mode fiber at a plurality of different radii from an optical center of the multi-mode fiber to launch the optical pulses into a core of the multi-mode fiber, and evaluating differential mode delay of the optical pulses launched into the core of the multi-mode fiber.

Other systems and methods according to embodiments of the inventive subject matter will be or become apparent to one with skill in the art upon review of the following drawings and detailed description. It is intended that all such additional systems and methods be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which:

FIGS. 1A and 1B illustrate a conventional technique for optically centering two fibers of the same type, i.e., two single-mode fibers or two multi-mode fibers, based on the coupling of optical power between the two fibers;

FIGS. 2A, 2B, and 2C illustrate a conventional technique for optically centering a single-mode fiber with a multi-mode fiber;

FIGS. 4A and 4B are block diagrams of the launching device shown in FIG. 3 according to various embodiments of the inventive subject matter;

FIGS. 5A and 5B are waveform diagrams that illustrate a first axis control signal and a second axis control signal, respectively, for driving a first axis movement controller and a second axis movement controller shown in FIG. 3 according to some embodiments of the inventive subject matter;

DETAILED DESCRIPTION

Figure 3:
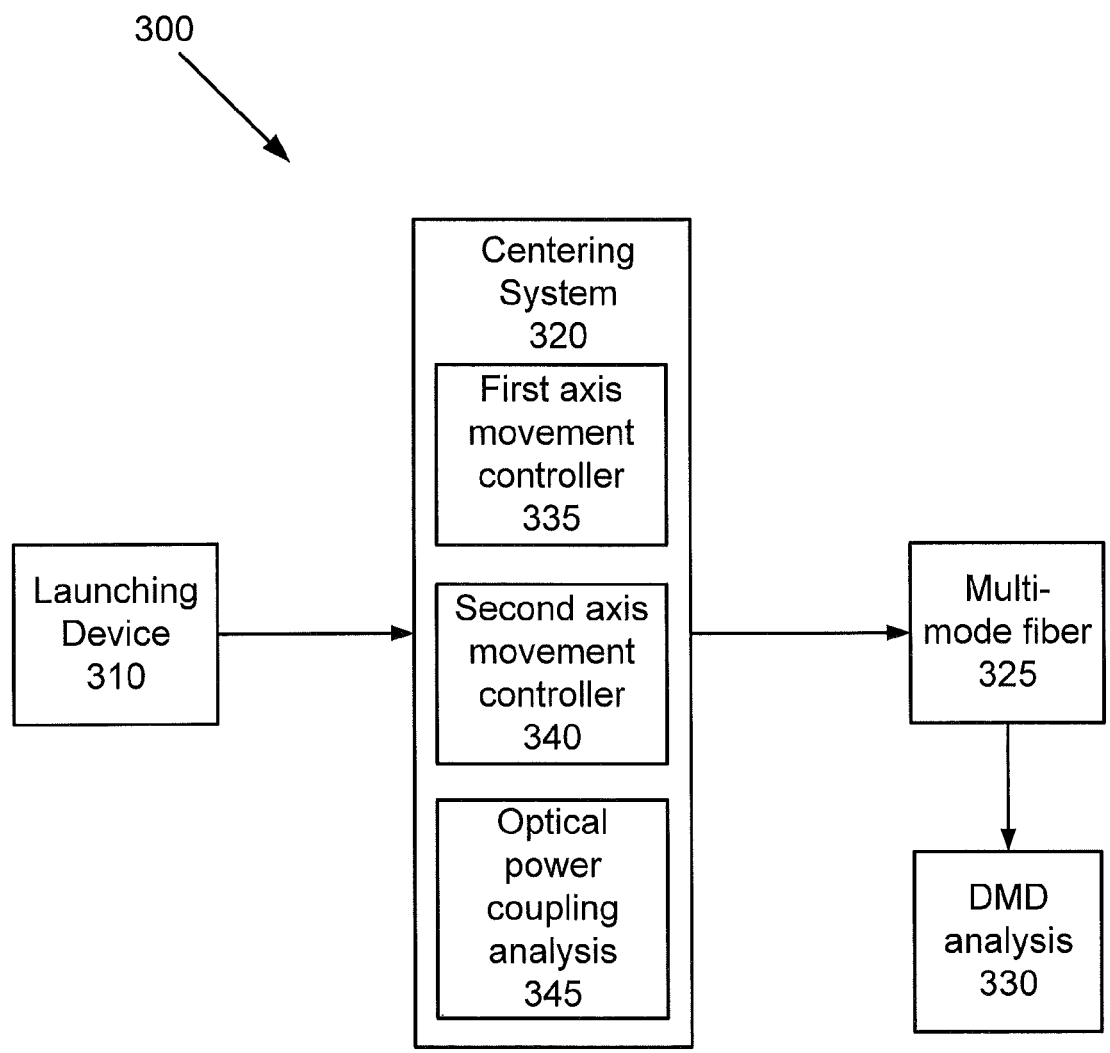
FIG. 3 is block diagram of a test system for a multi-mode fiber according to various embodiments of the inventive subject matter.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises," "comprising," "includes," and/or "including" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Some embodiments of the inventive subject matter may provide a relatively compact and portable fiber optic cable testing system that can be used to evaluate the differential mode delay (DMD) of multi-mode fibers both in the laboratory environment as well as in field installations. According to some embodiments of the present inventive subject matter, a DMD test system comprises a centering system that may align an optical pulse launching device with a multi-mode fiber under test by moving the launching device in a circular motion having a center corresponding to a rest position of the launching device and an outer diameter corresponding to the outer diameter of the core region of the multi-mode fiber. The multi-mode fiber is positioned until the optical power coupled from the launching device to the multi-mode fiber is minimum or falls below a threshold. This is indicative that the launching device is generally tracing the core-cladding boundary region of the multi-mode fiber. The multi-mode fiber may be fixed in this position and the launching device may be allowed to return to its rest position to optically center the launching device with the multi-mode fiber.

The DMD characteristics of high bandwidth laser optimized multi-mode fibers (e.g., OM3 and OM4 standard fibers) can be verified in the field using a portable test system in accordance with some embodiments of the inventive subject matter. DMD performance of a fiber can be verified pre-installation and/or post-installation via actual test results. Such test results can be used to verify the performance claims of a manufacturer for a particular fiber type. The field testing may provide a level of assurance for a customer regarding the fiber's performance beyond mere visual inspection of a label indicating or linking to factory testing results. Field testing may provide verification of a fiber's performance in real-time and may confirm not only the initial performance of the fiber, but also that the fiber is properly installed and continues to perform at a desired level over time. A portable test system according to some embodiments of the inventive subject matter may also be used to perform a competitive analysis between fiber installations or products provided by different manufacturers or between different grades of fiber products.

Referring to FIG. 3, a test system 300 for a multi-mode fiber, according to some embodiments of the inventive subject matter, comprises a launching device 310, a centering system 320, a multi-mode fiber 325, and a DMD analysis system 330 that are configured as shown. The centering system 320 comprises a first axis movement controller 335, a second axis movement controller 340, and an optical power coupling analysis module 345.

Referring to FIG. 4A, the launching device 310, in some embodiments of the inventive subject matter, comprises an optical pulse generator 400 coupled to a single-mode fiber 405. The single mode fiber 405 comprises a cladding that surrounds a core region. The single mode fiber 405 is coupled to the optical pulse generator 400 so as to receive optical pulses from the optical pulse generator 400 into the core region of the single mode fiber 405. In other embodiments shown in FIG. 4B, the launching device 310 comprises the optical pulse generator 400 coupled to a lens system 410. To keep the size of the test system 300 relatively compact for portability purposes, the optical pulse generator 400 may comprise a diode laser in some embodiments.

Figure 6:
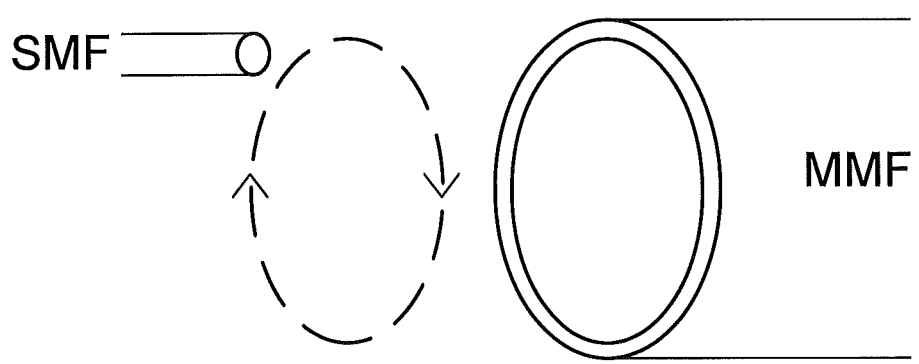
FIG. 6 illustrates movement of a single-mode fiber that is part of the launching device shown in FIG. 3 relative to a multi-mode fiber during optical centering of the single-mode fiber and the multi-mode fiber according to some embodiments of the inventive subject matter.

The centering system 320 comprises a first axis movement controller 335 and a second axis movement controller 340 that are operable to move the launching device in a circular motion having a center corresponding to a rest position of the launching device and a diameter corresponding to a diameter of the multi-mode fiber 325. The first and second axes may be substantially perpendicular to each other and the first and second axis controllers 335 and 340 may be responsive to a first axis control signal and a second axis control signal, respectively. To generate the circular motion, the first axis control signal and the second axis control signal may be generated, for example, as shown in FIGS. 5A and 5B, respectively, such that the two signals are 90 degrees out of phase with one another. In some embodiments of the inventive subject matter, the first axis control signal $V_1$ is given by $V_1 = Vdc + Vo\ sin(\omega t)$ and the second axis control signal $V_2$ is given by $V_2 = Vdc + Vo\ sin(wt-90°)$. The DC offset Vdc may be zero or non-zero based on the design of the first and second axis controllers 335 and 340. When the first axis controller 335 and the second axis controller 340 are driven using the first and second axis control signals shown in FIGS. 5A and 5B, respectively, the centering system 320 may move, for example, a single-mode fiber 405 in a circular motion having a diameter corresponding to a core diameter of the multi-mode fiber 325 as shown in FIG. 6. The first axis controller 335 and the second axis controller 340 may comprise materials and/or apparatus that can translate electrical signals (e.g., the first and second axis control signals) into physical movement. Such materials and/or apparatus may include, but are not limited to a piezoelectric device, an electro-active polymer device and a magnetostrictive device.

Returning to FIG. 3, the centering system 320 comprises an optical power coupling analysis module 345 that is configured to determine the amount of optical power coupled from the launching device 310 into the multi-mode fiber 325. The multi-mode fiber 325 comprises a cladding that surrounds a core region. Once the centering system 320 aligns the launching device 310 with an optical center of the multi-mode fiber 325, the launching device 310 may transmit optical pulses at various points into core region of the multi-mode fiber 325. The DMD analysis 330 may be configured to analyze the DMD of the various optical pulses transmitted into the multi-mode fiber 325.

Figure 7:
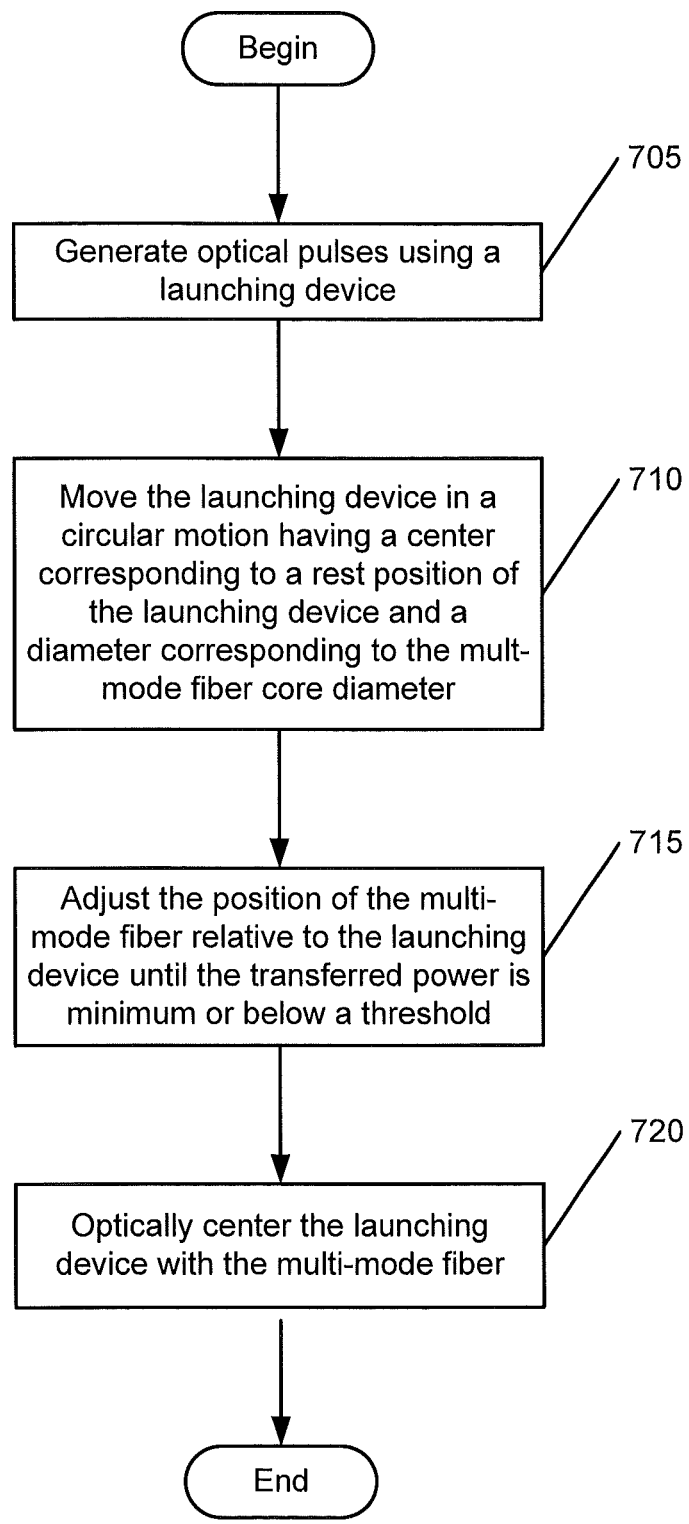
FIG. 7 is a flowchart that illustrates exemplary operations of the test system of FIG. 3 according to some embodiments of the present inventive subject matter.

FIG. 7 is a flowchart that illustrates exemplary operations of the test system 300 of FIG. 3 according to some embodiments of the present inventive subject matter. One approach to optically centering an optical pulse launching device with a multi-mode fiber is to optically center two single-mode fibers or two multi-mode fibers as described above with reference to FIGS. 1A and 1B and then, in the case of two single-mode fibers, replace one of the single-mode fibers with a multi-mode fiber to be tested or, in the case of two multi-mode fibers, replace one of the multi-mode fibers with the launching device 310. The test system 300 of FIG. 3, however, may provide an improved optical centering between the launching device 310 and the multi-mode fiber 325. Operations begin at block 705 where optical pulses are generated using the launching device 310. The centering system 320 at block 710 drives the first axis movement controller 335 and the second axis movement controller 340 using first axis and second axis control signals, respectively, to move the launching device in a circular motion having a center corresponding to a rest position of the launching device and a diameter corresponding to a core diameter of the multi-mode fiber 325 as shown in FIG. 6. The optical power coupling analysis module 345 may monitor the optical power coupled from the launching device 310 into the multi-mode fiber 325 while the centering system 320 adjusts the position of the multi-mode fiber 325 relative to the launching device 310. This adjustment may be performed by moving either the multi-mode fiber 325, the launching device 310, or both the multi-mode fiber 325 and the launching device 310 relative to each other. The centering system 320 at block 715 continues to adjust the relative positioning between the multi-mode fiber 325 and the launching device 310 until the optical power coupled from the launching 310 into the multi-mode fiber reaches a minimum or drops below a defined threshold. This is indicative of the launching device 310 generally tracing the core-cladding boundary region of the multi-mode fiber 325 such that little to none of the optical power is coupled from the launching device 310 into the multi-mode fiber 325. At block 720, the centering system centers the launching device 310 with the multi-mode fiber by fixing the position of the multi-mode fiber 325 at the position where the optical power coupled from the launching device 310 into the multi-mode fiber 325 is minimum or below the threshold and returning the launching device 310 to the rest position (which corresponds to $V_o = 0$ for the control signal). This may be performed by turning off the oscillatory or sinusoidal part of the first and second axis control signals used to drive the first and second axis movement controllers 335 and 340 according to some embodiments of the inventive subject matter.

Figure 8:
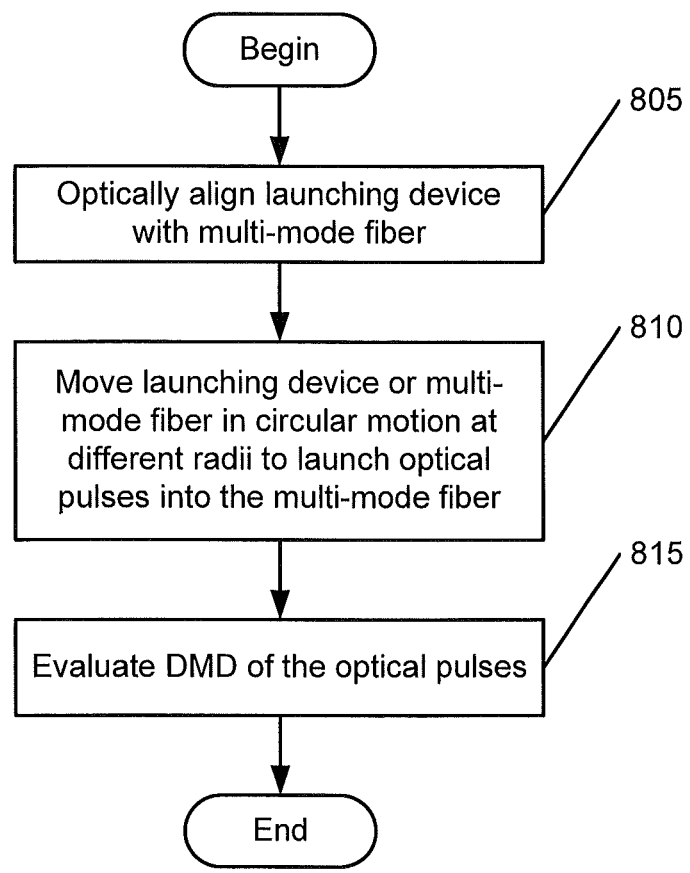
FIG. 8 is a flowchart that illustrates exemplary operations of performing differential mode delay (DMD) testing of a multi-mode fiber using the test system of FIG. 3 according to some embodiments of the present inventive subject matter.
Figure 9A:
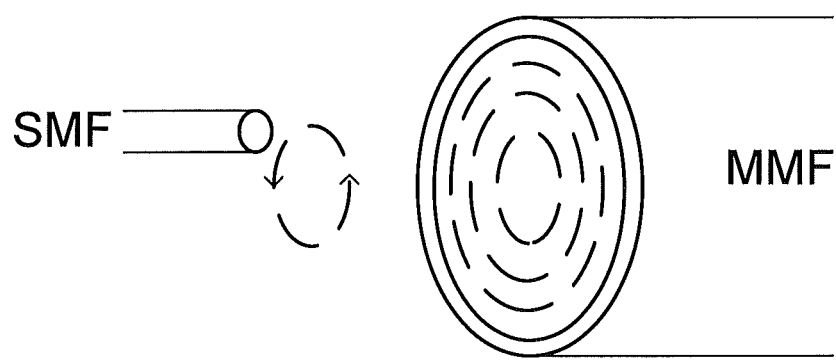
FIGS. 9A and 9B illustrate the movement of a single-mode fiber that is part of the launching device shown in FIG. 3 relative to a multi-mode fiber during a differential mode delay (DMD) test according to some embodiments of the inventive subject matter.
Figure 9B:
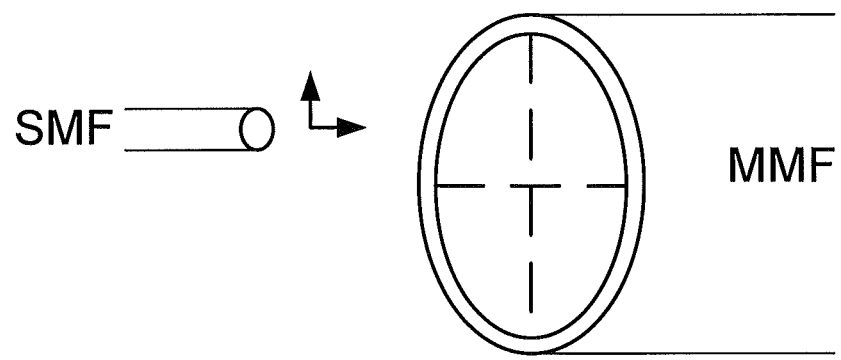

FIG. 8 is a flowchart that illustrates exemplary operations of performing DMD testing of a multi-mode fiber using the test system 300 of FIG. 3 according to some embodiments of the present inventive subject matter. Operations begin at block 805 where the launching device 310 is optically centered with the multi-mode fiber 325 as described above with reference to FIG. 7. At block 810, the centering system 320 drives the first axis movement controller 335 and the second axis movement controller 340 using first axis and second axis control signals, respectively, to move one of the launching device 310 and the multi-mode fiber 325 in a circular motion relative to the other one of the launching device 310 and the multi-mode fiber at a plurality of different radii from the optical center to launch the optical pulses from the launching device 310 into the core region of the multi-mode fiber 325. This is illustrated, for example, in FIG. 9A where the dashed circles on the face of the multi-mode fiber represent the motion of the single-mode fiber that is used as part of the launching device 310 to launch optical pulses into the multi-mode fiber core. In other embodiments shown in FIG. 9B, the centering system 320 may move the launching device in linear paths across the face of the multi-mode fiber to launch optical pulses into the multi-mode fiber 325. The linear paths are represented by the dashed lines on the face of the multi-mode fiber 325 in FIG. 9B. By launching the optical pulses into the multi-mode fiber 325 along the paths of a plurality of concentric circles as shown in FIG. 9A, however, the circular homogeneity of the core of the multi-mode fiber 325 may be better tested as the circles provide enhanced coverage of the inner core region of the multi-mode fiber 325.

The DMD analysis module 330 may evaluate the DMD for the optical pulses launched into the core of the multi-mode fiber 325 at the various positions at block 815. In some embodiments, the first axis movement controller 335 and the second axis movement controller 340 may scan the face of the multi-mode fiber 325 in circles of varying radii having 1 µm spatial resolution.

Some embodiments of the present inventive subject matter may provide a DMD test system for a multi-mode fiber that comprises component parts that are small enough that the DMD test system may be used not only in a laboratory environment, but may also be transported to field sites to verify the performance of fiber installations at a customer site, for example. For example, the entire test system may be approximately 22"×18"×12". Moreover, because of the ability to optically center the optical pulse launching device with the multi-mode fiber under test, the accuracy of the DMD tests need not be sacrificed despite the reduced size of the test system. Test systems according to embodiments of the inventive subject matter may, therefore, be used for both pre-installation and post-installation DMD tests of a multi-mode fiber.

Many variations and modifications can be made to the preferred embodiments without substantially departing from the principles of the present invention. All such variations and modifications are intended to be included herein within the scope of the present invention, as set forth in the following claims.

That which is claimed:

1. A test system for a multi-mode fiber, comprising:
a launching device that is configured to generate optical pulses and having a rest position; and
a centering system that is configured to move the launching device in a circular motion having a center corresponding to the rest position and a diameter corresponding to a core diameter of the multi-mode fiber, to adjust a position of the multi-mode fiber relative to the launching device while the launching device is moving in the circle until an optical power coupled from the launching device into the multi-mode fiber is minimum or below a threshold, to optically center the launching device with the multi-mode fiber by fixing the position of the multi-mode fiber responsive to the optical power coupled from the launching device into the multi-mode fiber being minimum or below the threshold and returning the launching device to the rest position.

2. The test system of claim 1, wherein the launching device comprises:
an optical pulse generator; and
a lens system that is coupled to the optical pulse generator and is positioned to receive the optical pulses.

3. The test system of claim 2, wherein the optical pulse generator is a laser.

4. The test system of claim 3, wherein the laser is a diode laser.

5. The test system of claim 1, wherein the launching device comprises:
an optical pulse generator; and
a single-mode fiber that is coupled to receive the optical pulses into a core thereof.

6. The test system of claim 5, wherein the optical pulse generator is a laser.

7. The test system of claim 6, wherein the laser is a diode laser.

8. The test system of claim 1, wherein the centering system comprises:
a first axis movement controller; and
a second axis movement controller;
wherein the first axis is substantially perpendicular to the second axis.

9. The system of claim 8, wherein the first axis movement controller is responsive to a first axis control signal and the second axis movement controller is responsive to a second axis control signal, the first axis control signal being about 90 degrees out of phase with the second axis control signal to move the launching device in the circular motion.

10. The system of claim 9, wherein the first axis movement controller comprises a first piezoelectric device and the second axis controller comprises a second piezoelectric device.

11. The system of claim 9, wherein the first axis movement controller comprises a first electro-active polymer device and the second axis controller comprises a second electro-active polymer device.

12. The system of claim 9, wherein the first axis movement controller comprises a first magnetostrictive device and the second axis controller comprises a second magnetostrictive device.

13. The system of claim 1, wherein the centering system is further configured, responsive to optically centering the launching device with the multi-mode fiber, to move one of the launching device and the multi-mode fiber in a circular motion relative to the other one of the launching device and the multi-mode fiber at a plurality of different radii from the rest position of the launching device to launch the optical pulses into a core of the multi-mode fiber.

14. A method of operating a test system for a multi-mode fiber, comprising:
generating optical pulses using a launching device the launching device having a rest position;
moving the launching device in a circular motion having a center corresponding to the rest position and a diameter corresponding to a core diameter of the multi-mode fiber;
adjusting a position of the multi-mode fiber relative to the launching device while the launching device is moving in the circle until an optical power coupled from the launching device into the multi-mode fiber is minimum or below a threshold; and
optically centering the launching device with the multi-mode fiber by fixing the position of the multi-mode fiber responsive to the optical power coupled from the launching device into the multi-mode fiber being minimum or below the threshold and returning the launching device to the rest position.

15. The method of claim 14, wherein the launching device comprises an optical pulse generator.

16. The method of claim 15, wherein the launching device further comprises a lens system that is coupled to the optical pulse generator and is positioned to receive the optical pulses.

17. The method of claim 15, wherein the launching device further comprises a single-mode fiber that is coupled to the optical pulse generator and is positioned to receive the optical pulses.

18. The method of claim 14, wherein moving the launching device comprises:
moving the launching device along a first axis;
moving the launching device along a second axis;
wherein the first axis is substantially perpendicular to the second axis.

19. The method of claim 18, wherein moving the launching device along the first axis comprises moving the launching device along the first axis responsive to a first axis control signal;
wherein moving the launching device along the second axis comprises moving the launching device along the second axis responsive to a second axis control signal; and wherein the first axis control signal is about 90 degrees out of phase with the second axis control signal so as to move the launching device in the circular motion.

\* \* \* \* \*